United States Patent [19]

Elmer

[11] Patent Number: 5,042,629
[45] Date of Patent: Aug. 27, 1991

[54] VISCOUS FLUID SHEAR CLUTCHES AND CONTROL VALVES THEREFOR

[75] Inventor: Arthur E. H. Elmer, Nailsworth, England

[73] Assignee: Kysor Industrial Corporation, Cadillac, Mich.

[21] Appl. No.: 461,535

[22] Filed: Jan. 5, 1990

[30] Foreign Application Priority Data

Jan. 13, 1989 [GB] United Kingdom ............... 8900756
Apr. 11, 1989 [GB] United Kingdom ............... 8908129

[51] Int. Cl.$^5$ ............................................. F16D 31/00
[52] U.S. Cl. ................................... 192/58 B; 192/82 T
[58] Field of Search .............. 192/58 B, 82 T, 103 R; 137/625.65; 236/87, 100

[56] References Cited

U.S. PATENT DOCUMENTS

| | | | |
|---|---|---|---|
| 3,144,922 | 8/1964 | Weir | 192/58 B |
| 3,217,849 | 11/1965 | Weir | 192/82 T |
| 3,388,694 | 6/1968 | Elmer | 123/41.12 |
| 3,436,017 | 4/1969 | Elmer | 236/92 |
| 3,446,430 | 5/1969 | Elmer | 230/271 |
| 3,467,071 | 9/1969 | Elmer | 123/41.12 |
| 3,684,397 | 8/1972 | Elmer | 416/39 |
| 3,738,571 | 6/1972 | Elmer | 236/100 |
| 3,757,914 | 9/1973 | Elmer | 192/48.3 |
| 3,777,866 | 12/1973 | Elmer | 192/91 A |
| 3,880,265 | 4/1975 | Elmer | 192/58 B |
| 3,893,555 | 7/1975 | Elmer | 192/58 B |
| 3,902,663 | 9/1975 | Elmer | 236/87 |
| 3,927,830 | 12/1975 | Beiski | 236/100 |
| 3,968,866 | 7/1976 | Leichliter et al. | 192/58 |
| 4,086,989 | 5/1978 | Spence | 192/58 B |
| 4,086,990 | 5/1978 | Spence | 192/58 B |
| 4,176,630 | 12/1979 | Elmer | 123/41.12 |
| 4,310,084 | 1/1982 | Nonnenmann | 192/58 B |
| 4,437,554 | 3/1984 | Haeck | 192/58 B |
| 4,488,628 | 12/1984 | Kluna et al. | 192/58 B |
| 4,488,680 | 12/1984 | Itoh | 236/100 X |
| 4,650,045 | 3/1987 | Weible et al. | 192/0.02 R |
| 4,653,624 | 3/1987 | Mader | 192/58 B |
| 4,909,367 | 3/1990 | Elmer | 192/58 B |

FOREIGN PATENT DOCUMENTS

| | | |
|---|---|---|
| 0055121 | 6/1982 | European Pat. Off. . |
| 0068644 | 1/1983 | European Pat. Off. . |
| 0105647 | 4/1984 | European Pat. Off. . |
| 0274408 | 7/1988 | European Pat. Off. . |
| 0293102 | 11/1988 | European Pat. Off. .......... 192/58 B |
| 3204554 | 8/1982 | Fed. Rep. of Germany . |
| 2349766 | 11/1977 | France . |
| 2550594 | 2/1985 | France . |
| 954784 | 4/1964 | United Kingdom . |
| 979629 | 1/1965 | United Kingdom . |
| 1036231 | 7/1966 | United Kingdom . |
| 1058832 | 2/1967 | United Kingdom . |
| 1163393 | 9/1969 | United Kingdom . |
| 1375812 | 11/1974 | United Kingdom . |
| 1448704 | 9/1976 | United Kingdom . |
| 1464559 | 2/1977 | United Kingdom . |
| 1465341 | 2/1977 | United Kingdom . |
| 1556599 | 11/1979 | United Kingdom . |
| 1561934 | 3/1980 | United Kingdom . |

*Primary Examiner*—Allan D. Herrmann
*Assistant Examiner*—Andrea Pitts
*Attorney, Agent, or Firm*—Price, Heneveld, Cooper, DeWitt & Litton

[57] ABSTRACT

A viscous fluid shear clutch comprises a two-part outer casing 14,15 and an inner clutch member 10 between which is defined a clearance gap into which viscous fluid may flow to provide an adjustable degree of coupling between the casing and the clutch members. Fluid is continually pumped out of the gap by a circumferential scoop pump. The clutch may be assembled for reverse operation by indexing the casing parts relative to one another. The quantity of fluid in the gap may be controlled dependent on sensed temperature and sensed speed or sensed temperature alone. A thermo pressure valve provides a pressure force related to the sensed temperature; this relationship may be inverse for failsafe operation.

16 Claims, 4 Drawing Sheets

VISCOUS FLUID SHEAR CLUTCHES AND CONTROL VALVES THEREFOR

This invention relates to viscous fluid shear clutches and control valves for use in such clutches.

There are many known forms of viscous fluid clutch for providing drive between an engine and a cooling fan which incorporate arrangements which sense the coolant air temperature and/or the output speed of the clutch and modulate the degree of coupling between the input and output accordingly. However, many systems experience severe hysteresis which means that, in practice, the coolant is either overcooled—representing a needless waste of engine power—or undercooled—leading to possible engine damage.

A need exists for a viscous fluid clutch in which the modulation of the drive to the fan is performed with less hysteresis, thus providing improved engine efficiency.

Most known forms of viscous fluid shear clutch employ a scoop pump arrangement in which the scoops face an axial end face of the inner clutch member—so called "side scoop" arrangements. Such arrangements require careful and precise alignment of the scoop and the opposing working face of the clutch member and this can be difficult to achieve and time consuming because of axial float of the shaft. Thus the lowest clearances possible between the scoop and the clutch member still leave significant leakage paths which reduce the efficiency of the scoop pumps. Also, in such arrangements even when the clutch is drained there is still a significant degree of coupling because the scoops are on the side of the clutch member.

A need exists for a viscous fluid shear clutch incorporating a pumping arrangement which provides good pumping efficiency, may be assembled easily, and which allows the clearance gap between the drive members to be substantially "dry".

A need also exists for a viscous fluid shear clutch which can be assembled for either clockwise or anticlockwise rotation with little or no modification necessary to the component parts.

A need also exists for a viscous fluid shear clutch in which the clutch provides full coupling if the temperature signal is lost.

Accordingly, in one aspect this invention provides a viscous fluid shear clutch for providing drive between an engine and a cooling fan, said clutch comprising:

a rotary casing, an inner clutch member within the casing and spaced therefrom by a clearance gap, a fluid reservoir communicating with said clearance gap, pump means arranged to pump fluid from the clearance gap to the reservoir in response to relative rotation between the casing and the inner clutch member, valve means arranged to control the flow of fluid between the pump means and the clearance gap and including a movable control element, thermal sensor means including a remote sensor for sensing the temperature of a coolant fluid and a separate actuator for generating a temperature dependent force which acts upon said movable control element, speed sensor means for centrifugally generating a speed dependent force which acts upon said movable control element whereby an increase in the sensed temperature or a decrease in the sensed speed tends to adjust the valve means to increase the fluid in the clearance gap.

Preferably, said thermal sensor means is arranged to provide a temperature dependent force which decreases with an increase in temperature, thereby to provide a failsafe feature.

Preferably, said pump means is constituted by a generally plain circumferential wall portion of said inner clutch member and at least one circumferentially extending scoop of limited arcuate extent provided in an opposed cylindrical wall of the casing, each scoop having associated therewith a scoop pump outlet passage arranged adjacent the end region of the scoop which trails in the sense of rotation of the scoop relative to the inner clutch member.

To allow assembly for rotation in either sense, said rotary casing preferably includes one part defining at least a major portion of each scoop and another part defining at least a major portion of each scoop pump outlet passage, the two parts being capable of being assembled in either one of two relative angular positions whereby each scoop pump outlet passage can be located at either end region of the associated scoop depending on the intended sense of rotation of the clutch.

The thermal sensor means may include:

a thermo pressure valve having a valve body defining an inlet for servo fluid, an outlet for connection to said actuator, and a vent, shuttle spool means linearly movable within said body between a first position, which allows communication between said inlet and said outlet, and a second position which allows communication between said outlet and said vent, and a sensor element responsive to the sensed temperature for moving said shuttle spool means.

The shuttle spool means preferably isolates both said inlet and said vent from said outlet when it is in an intermediate position.

The shuttle spool means is preferably provided at spaced regions with seal surface means engageable in resilient sealing manner with respective valve seats in said valve body and the spacing between said seal surface means may be set as required. Each seal surface means may comprise a resilient 'O' ring.

Preferably movement of said shuttle spool means away from said intermediate position causes resilient compression of one of said 'O' rings against its valve seat and lifting of the other 'O' ring from its valve seat.

In another aspect, this invention provides a three way valve comprising a valve body defining three inlet/outlet means and a shuttle spool means linearly movable in said body between a position which allows communication between said first and second inlet/outlet means, and a position which allows communication between said first and third inlet/outlet means.

In another aspect, this invention provides a valve arrangement including a valve body defining an outlet port and at least two inlet ports each for receiving fluid at respective pressures, a shuttle spool means controlling the flow between said inlet and outlet ports and movable between one position in which one of said inlet ports communicates with said outlet port, and another position in which the other of said inlet ports communicates with said outlet port, wherein means are provided for moving said shuttle spool between said aforementioned positions dependent on at least one of said given pressures.

The invention may be performed in various ways and certain embodiments thereof will now be described by way of example only, reference being made to the accompanying drawings, in which.

Figure 1:
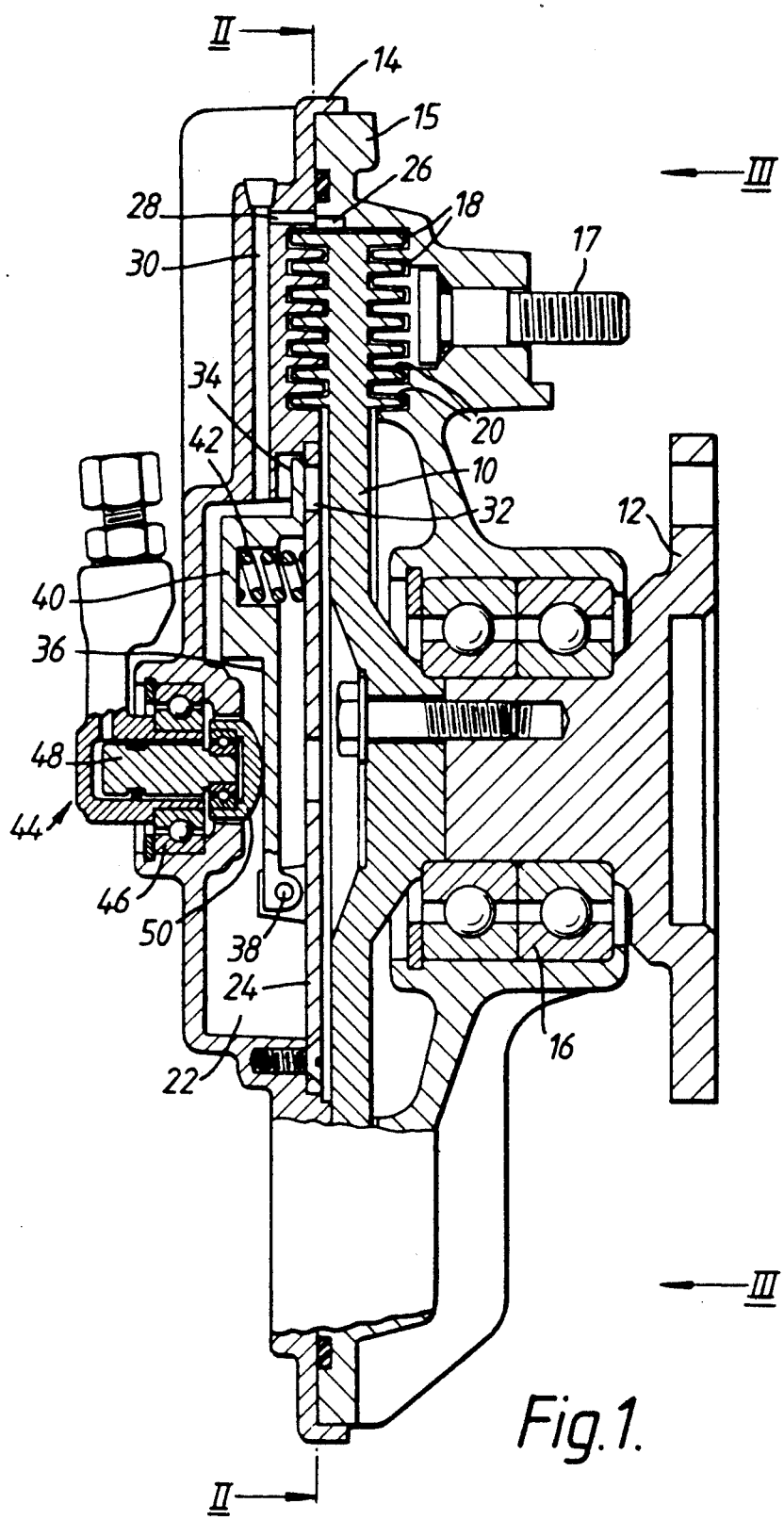
FIG. 1 is a cranked sectional view through a viscous fluid shear clutch in accordance with this invention.
Figures 4A, 4B, 4C:
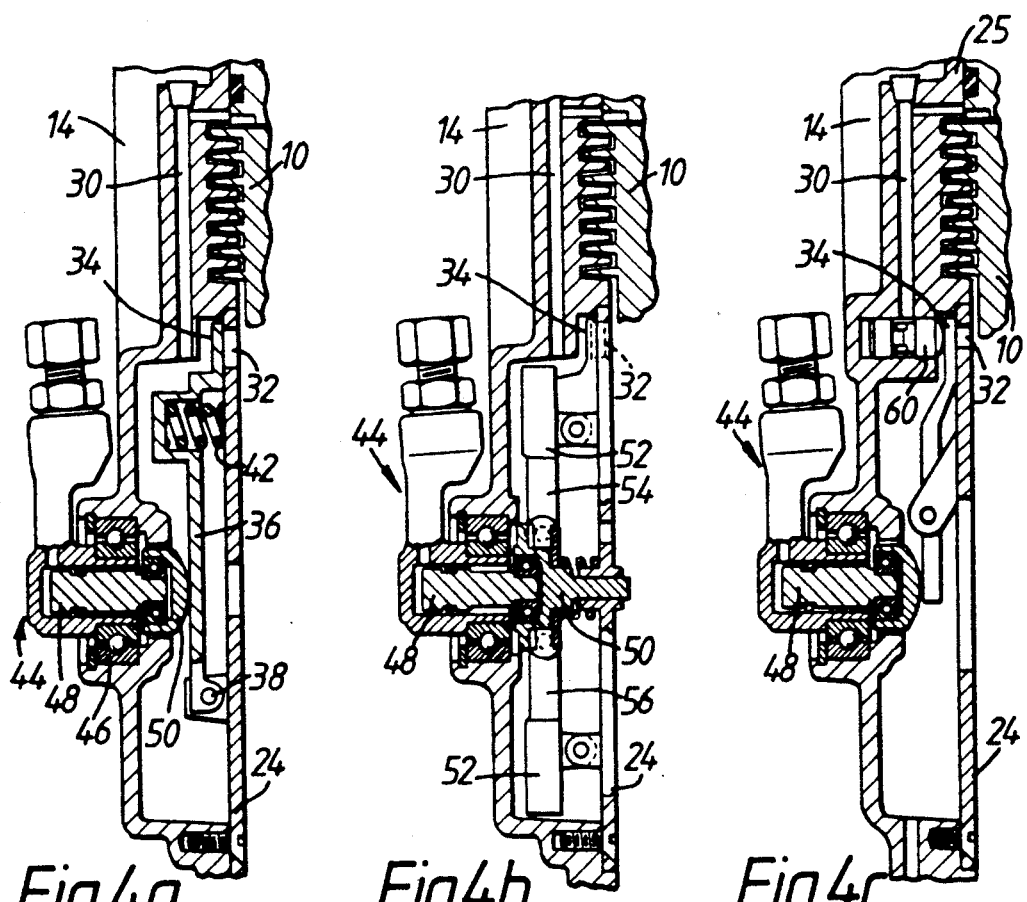
Figure 5A:
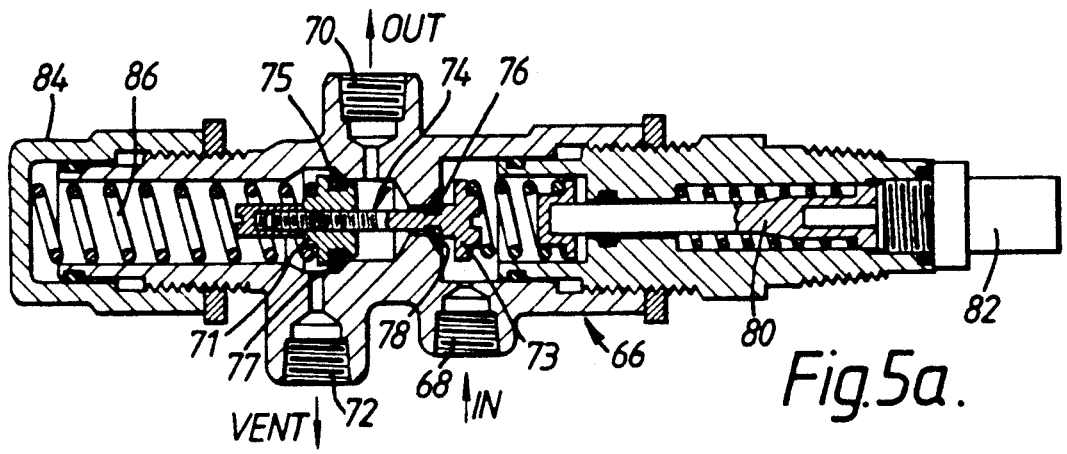
Figure 5B:
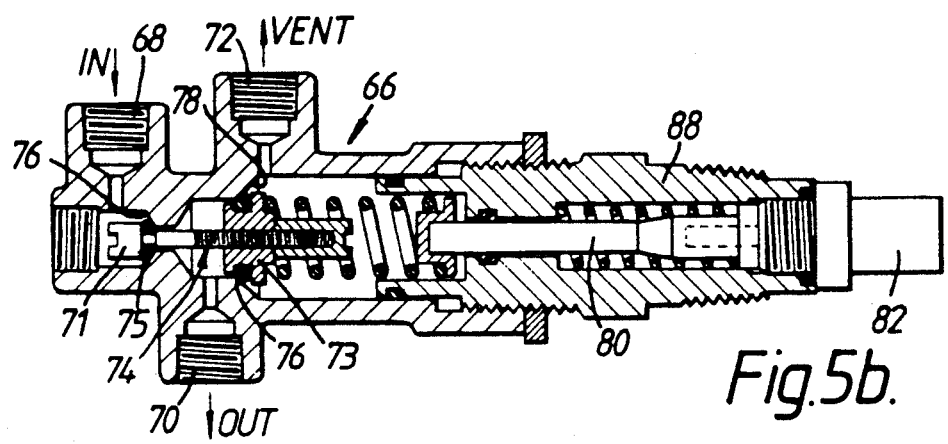
Figure 6:
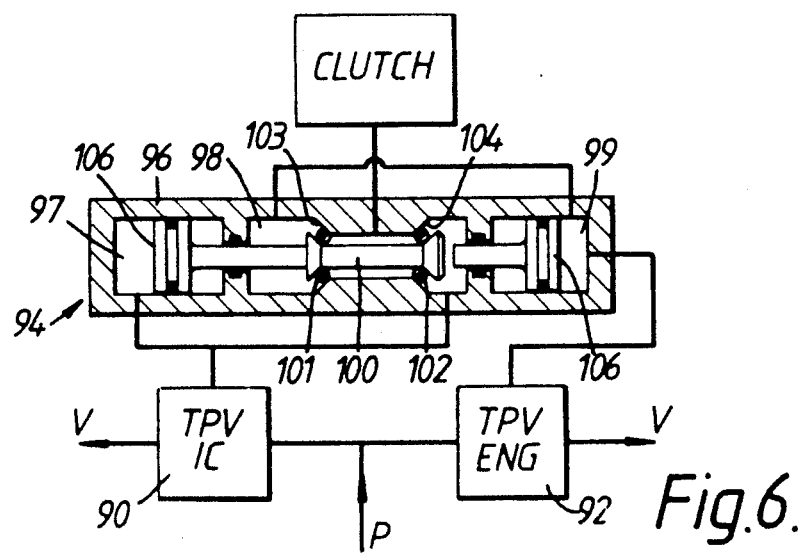

FIGS. 4a 4b and 4c are detail views of three modified control arrangements for a clutch of the general type illustrated in FIG. 1, FIGS. 5a and 5b are section views of two examples of thermal pressure valve for supplying a temperature dependant pressure signal to the actuator of the clutch of FIG. 1, and FIG. 6 is a schematic view of a dual temperature thermal pressure valve system for supplying a pressure signal to a viscous fluid shear clutch.

Figure 2A:
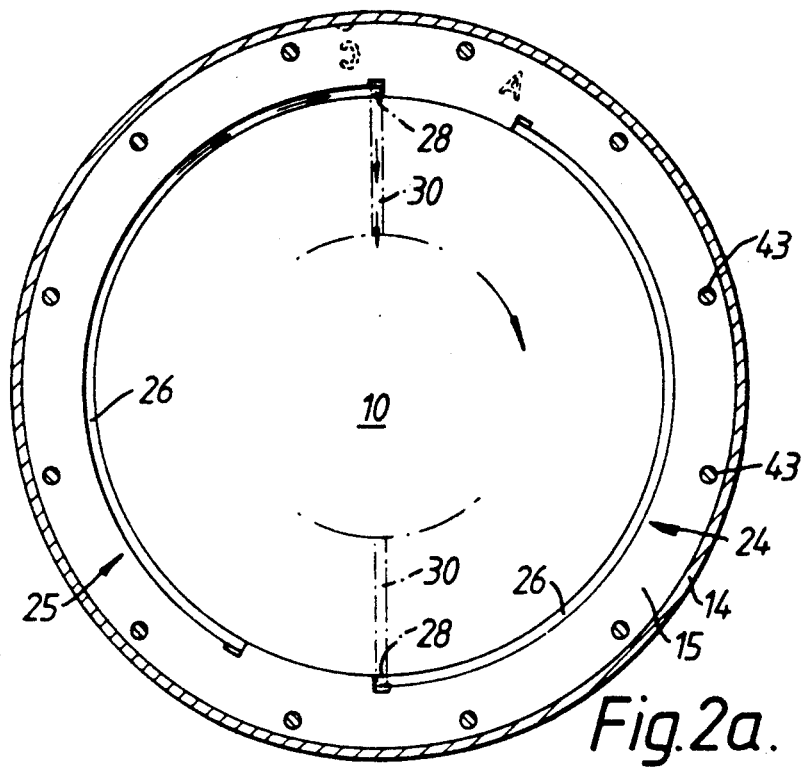
FIGS. 2a and 2b are transverse sectional views on lines II—II of the clutch of FIG. 1, showing the clutch when configured for clockwise rotation of the inner clutch member and anticlockwise rotation thereof, respectively.
Figure 2B:
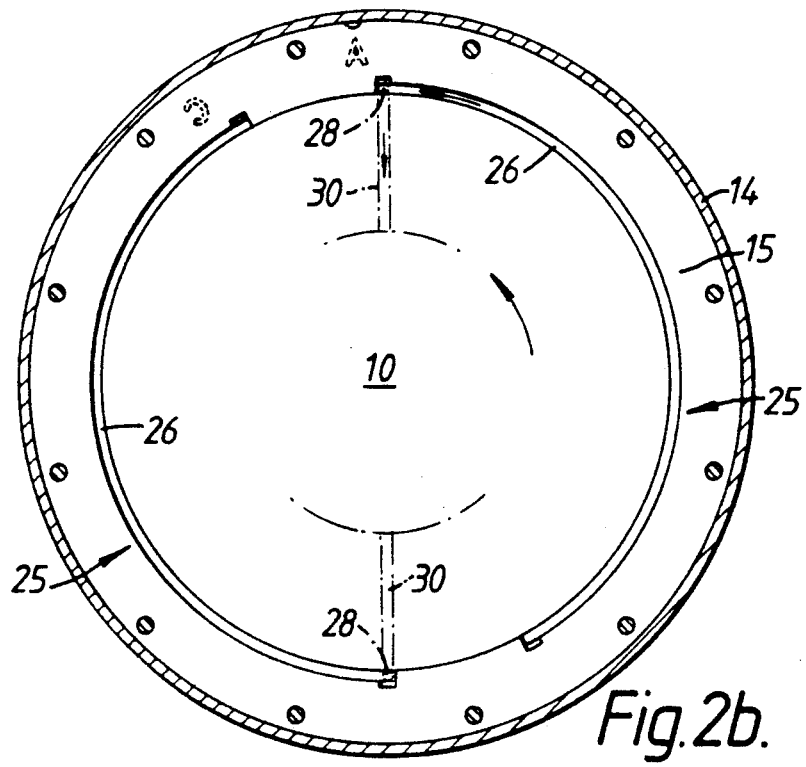
Figure 3:
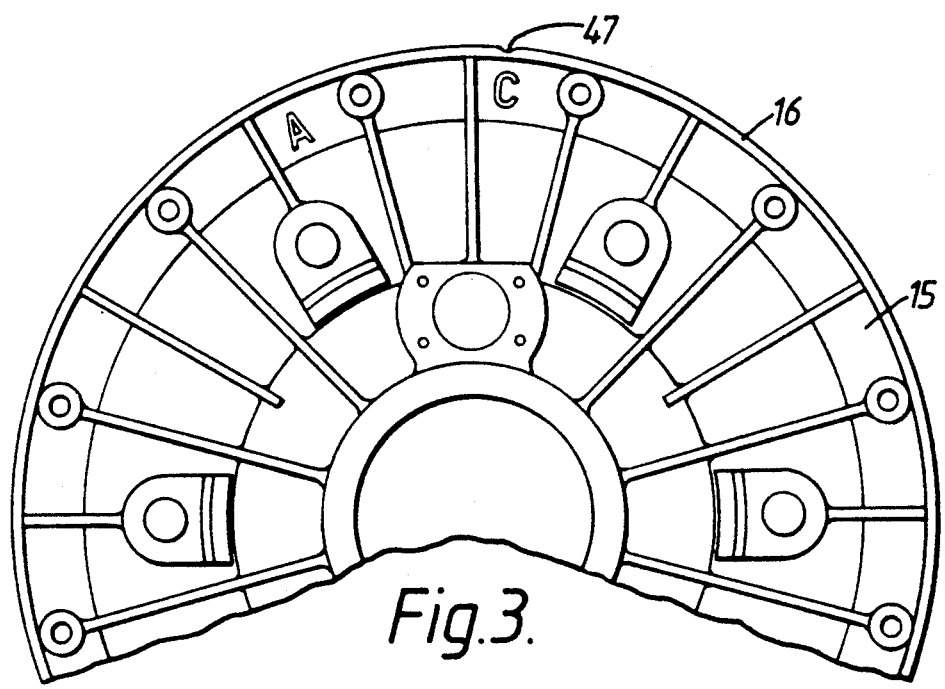
FIG. 3 is an end view on the rear housing of the clutch taken in the direction of arrows III—III of FIG. 1.

Referring to FIGS. 1 to 3, the invention is applied to a viscous fluid clutch of the general type including an internal clutch member or rotor 10 connected to and driven by a coupling 12 attached to an engine shaft (not shown). The rotor is positioned within a two part casing having a front part 14 and a rear part 15. A bearing 16 supports the rear part of the casing off the coupling 12 or shaft. In this example, the casing includes threaded studs 17 which support the blades of a fan (not shown). The rotor 10 has a series of closely spaced annular rings 18 respectively located in a series of grooves 20 in the front and rear parts 14 and 15 of the casing to define a labyrinthine clearance gap of considerably extended area across which torque may be transmitted by viscous shear forces. The amount of torque transmitted may be increased or decreased by increasing (filling) or decreasing (draining) the amount of viscous hydraulic fluid in the gap.

A fluid reservoir 22 is formed between the front casing part 14 and an internal partition wall 24 and fluid is continuously pumped from the clearance gap to the reservoir by diametrically opposed pump arrangements 25. Each pump arrangement 25 comprises an arcuate scoop 26 formed in the rear casing part 15 and spaced closely from the outer circumferential periphery of the internal rotor 10. On rotation of the rotor 10, viscous fluid adjacent each scoop 26 is entrained by the rotor and drawn towards an outlet port 28 in the end of the scoop that trails in the sense of the rotation of the scoop relative to the rotor. Fluid pumped from ports 28 passes to the reservoir 22 via respective radial passages 30. The assembly of the clutch for clockwise and anticlockwise rotation will be discussed below in relation to FIGS. 2 and 3.

Fluid in the reservoir 22 may drain back to the clearance gap via one or more valve openings (one, 32 shown in the drawings) which is opened or closed by a valve blade 34 forming an extension of a control element 36 pivotted at 38 to the partition wall 24. The control element includes an enlarged portion 40 which acts as a bob weight and is disposed relative to the pivot 38 so that the centrifugal force generated on rotation of the casing tends to urge the control element 36 to close the valve opening 32. Closing movement of the control element 36 is resisted by a compression spring 42 located between the control element 36 and the partition wall 24.

An actuator in the form of a pressure ram assembly 44 rotationally isolated from the casing by a bearing 46, includes an axially movable ram 48 provided with a rotationally isolated button 50 engageable with the control element. The pressure ram assembly 44 is supplied with a pressure signal from a thermal pressure valve of the form illustrated in FIG. 5(a) and to be described in detail below. The pressure signal decreases as the sensed temperature increases.

In operation, the pump arrangements 25 continually pump fluid from the clearance gap to the reservoir and flow between the reservoir and the gap is controlled dependent on both the engine coolant liquid temperature and the output speed of the clutch—i.e. the rotational speed of the casing 14, 15. Both the speed dependent force and the temperature dependent force act in the same sense, tending to move the control element 36 to close the aperture 32 in the partition wall 24, and these forces are opposed by the spring 42. An increase in the sensed temperature reduces the pressure signal applied to the ram assembly, so the control element 36 tends to open the aperture 32, thus increasing fluid in the clearance gap. Likewise, a reduction in the rotation speed of the casing and thus the fan—reduces the centrifugal force opposing the spring 42, so again tending to open the aperture and increase fluid in the gap.

An important feature of this arrangement is that if the pressure supply to the pressure ram assembly fails for any reason, the control element 36 will tend to open the aperture thus flooding the clearance gap with fluid to ensure that drive between the fan and the engine is preserved.

Another important feature is that the arrangement allows continuous modulation of fan speed versus coolant temperature across substantially the whole operating temperature range.

A further advantage is that the balance of a temperature dependent force against a centrifugally generated speed dependent force provides reduced hysteresis when the sensed temperature falls, because the speed force varies as the square of the speed. Also, the fan speed versus coolant temperature characteristics can be predicted reasonably accurately because the temperature/force characteristic of the thermal pressure valve and the speed/force characteristic of the speed sensor can be predicted mathematically.

This leads to a significant improvement of the efficiency of the cooling system because it allows the fan speed to be tied more closely with the coolant temperature (i.e. the cooling requirement) so that the problems of wasting engine energy by overcooling or risking engine damage by overheating are avoided.

Referring now to FIGS. 2a, 2b and 3, the casing parts 14, 15 of the clutch of FIG. 1 are configured so that they can be assembled for engine rotation in either the clockwise sense (FIG. 2a) or anticlockwise sense (FIG. 2b). For proper operation of the scoop pumps, the pump outlet passages or ports 28 must be in the trailing end of the scoops 26, as mentioned above, and so the layout of the scoops 26 and ports 28 must be changed for rotation in the opposite sense. This is achieved in the present arrangement by providing the scoops 26 in the rear casing part 15 and the outlet port and passages in the front casing part and designing the arcuate extent of the scoops and the gaps therebetween in relation to the pitch of the bolts 43 which secure the casing together so that the "handedness" of the clutch can be switched simply by indexing the front and rear casing parts by one bolt spacing.

For ease of assembly during manufacture, the front casing part includes a notch mark 47 and the rear casing part includes the letters 'A' and 'C' which should be lined up with the mark to denote anticlockwise or clockwise rotation respectively.

FIGS. 4a, 4b and 4c show detail views of three alternative forms of control arrangement for being acted upon by a pressure ram assembly 44 and for controlling the flow through the aperture 32. Each arrangement is similar in some aspects to that of FIG. 1 so common reference numeral's have been used where appropriate.

FIG. 4(a) shows an "open loop" arrangement in which the temperature dependent force supplied by the assembly 44 is the only active control force applied to the control member 36; there is no speed dependent control force as the relevant inertias of the control member 36 are balanced about the pivot point 38. The temperature dependent force is resisted by a spring 42, and increases as the sensed temperature decreases.

FIG. 4b shows a "closed loop" arrangement in which a thermal pressure valve of the form illustrated in FIG. 5b below provides a temperature dependent force which increases with an increase in temperature. The pressure from the assembly is applied via a common yoke assembly 52, to the ends of two rocking control members 54, 56, one of which, the master control member 54 has a valve blade 34 cooperating with the aperture 32. Each of the control members has a bob weight portion 52 which centrifugally generates a force which opposes the temperature dependent force applied by the assembly 44. An increase in sensed temperature or a decrease in the speed of the casing tends to adjust the master control member 49 to increase the fluid in the clearance gap.

FIG. 4(c) shows another "closed loop" arrangement in which a thermal pressure valve of the form illustrated in FIG. 5(b) provides a temperature dependent force which increases with an increase in temperature. The temperature dependent force is counteracted by a speed dependent force provided by a piston 60 acted upon by the pressure generated by one of the circumferential scoop pumps 25. The pressure generated by the scoop pump decreases with an increase in differential speed between the outer casing and the inner clutch member so that, assuming a constant input speed, the scoop pump pressure increases with rotational speed of the casing.

Referring now to FIGS. 5(a) and 5(b), two forms of thermo pressure valves are illustrated, one (FIG. 5a) providing a pressure signal which decreases with an increase in temperature and the other (FIG. 5b) providing a pressure signal which increases therewith.

The valve of FIG. 5(a) comprises a valve body 66 which defines an inlet 68, an outlet 70, and a vent 72. A shuttle spool 74 is mounted in the body and includes at each end region an 'O' ring 75, 76 which engages a respective chamfered valve seat 77, 78 provided within the valve body. The shuttle spool 74 is made of two parts 71, 73 threaded together which allow the spacing between the 'O' rings to be adjusted. In use, the valve is adjusted so that, when in the equilibrium or intermediate position of the shuttle spool 74, both 'O' rings seal against their valve seats so that there is no communication between any of the inlet 68, outlet 70 and vent 72.

Shifting of the shuttle spool 74 to the left, as viewed in FIG. 5a, will compress the 'O' ring seal 76 against the valve seat 78, thus maintaining the seal between the inlet 68 and the outlet 70, whilst at the same time lifting the 'O' ring 75 off the valve gear 77 so allowing flow between the outlet 70 and the vent 72. Likewise, rightward shifting of the shuttle spool 74 allows flow between the inlet 68 and the outlet 70, whilst preventing flow between the outlet 70 and the vent 72.

At one end, the shuttle spool 74 is connected via a spring to the actuator rod 80 of a thermal sensor 82 such as a wax capsule, which senses the temperature of the engine coolant. The temperature/pressure characteristics of the thermo valve can be biassed by turning an adjustable cap 84 which applies an adjustable biass force via a spring 85 to the left hand end of the shuttle spool 74.

The valve of FIG. 5 (b) operates in the reverse sense, i.e. the output pressure increases with sensed temperature, but the components are similar in form and have been given common reference numbers. In this arrangement bias adjustment may be effected by turning the thermal sensor housing 88.

Apart from at lower temperatures of the operating range, both valves modulate the pressure substantially linearly with sensed temperature.

FIG. 6 shows schematically a dual temperature thermal pressure valve system which responds to two different temperatures. In the example shown, the valve responds both to the intercooler temperature and to the engine coolant temperature. Both temperatures are sensed by thermopressure valves 90, 92 respectively of the form shown in FIG. 5 (b)—i.e. which provide an increase in the output pressure as the sensed temperature increases. The temperature modulated pressure signals are supplied to a combiner valve 94 which comprises a body 96 defining left-hand, central and right hand chambers 97, 98, 99, respectively.

The central chamber 98 includes a shuttle spool 100 with two 'O' rings 101, 102 which seal against valve seats 103, 104 in the valve body when the shuttle spool is in an intermediate position. Each of the other chamber includes a piston 106 having a push rod for engaging the shuttle valve 100. The output pressure signal is taken from the central chamber, between the two valve seats 103, 104. The engine coolant modulated pressure signal is supplied to the right hand chamber 99 and the left hand end of the central chamber. The intercooler moderate temperature is supplied to the left hand chamber 97, and the right hand end of the central chamber.

In use the combine valve 94 provides a combined pressure signal to the clutch which is modulated in accordance with both the intercooler temperature and the engine temperature. In practice, the system could be set up so that the fan runs at an idle speed of 150 rpm when there is no cooling demand from either the intercooler or the engine coolant. When the intercooler signals a demand the system may supply a control pressure which causes the fan to run at, say, 800 rmp. This may be a simple on-off control or there may be continuous modulation up to 800 rpm. When the engine coolant signals a demand the system may supply a pressure signal which modulates the fan output speed in accordance with temperature from 800 rpm to just below the engine speed. The above forms of clutch automatically vary the output speed of the casing 14/15 in accordance with the sensed temperature. The clutch may be modified to adjust the output speed as required by a user, i.e.

by providing some form of pressure control for controlling the pressure supplied to the ram.

In the above examples of viscous clutch the force applied via assembly 44 is hydraulically generated; it could of course be generated in other ways, for example by an electrical force transducer.

Likewise, in the above examples of thermo-pressure valve, the force signal applied by the wax capsule could be applied by a force transducer and could represent a variable other than sensed temperature.

what is claimed is:

1. A viscous fluid shear clutch comprising:
   a rotary casing,
   an inner clutch member within the casing and spaced therefrom by a clearance gap,
   a fluid reservoir communicating with said clearance gap,
   pump means arranged to pump fluid from the clearance gap to the reservoir in response to relative rotation between the casing and the inner clutch member,
   valve means arranged to control the flow of fluid between the pump means and the clearance gap and including a movable control element,
   thermal sensor means including a remote sensor for sensing a temperature of a coolant fluid and a separate actuator for applying to said movable control element a modulated temperature dependent force causing the force applied in response to a given temperature to be substantially invariant, and
   speed sensor means for centrifugally generating a speed dependent force which acts upon said movable control element, whereby an increase in the sensed temperature or a decrease in the sensed speed tends to adjust the valve means to increase the fluid in the clearance gap.

2. A viscous fluid shear clutch according to claim 1, wherein said speed sensor means includes a mass associated with said movable control element for centrifugally generating a speed dependent force.

3. A viscous fluid shear clutch according to claim 1, wherein said thermal sensor means is arranged to provide a temperature dependent force which decreases with an increase in temperature, whereby accidental removal of said force tends to adjust the valve means to increase the fluid in the clearance gap.

4. A viscous fluid shear clutch according to claim 3, wherein an increase in said temperature dependent force or an increase in said speed dependent force urges said movable control element in the same direction.

5. A viscous fluid shear clutch according to claim 1, wherein said pump means is constituted by an outer generally curved circumferential wall portion of said inner clutch member and at least one circumferentially extending scoop of limited arcuate extent provided in an opposed curved cylindrical wall of the casing, each scoop having opposed end regions, a scoop pump outlet passage being associated with each scoop and arranged adjacent the scoop end region which trails in an intended sense of rotation of the rotary casing relative to the inner clutch member.

6. A viscous fluid shear clutch according to claim 5, wherein said rotary casing includes one part defining at least a major portion of each scoop and another part defining at least a major portion of each scoop pump outlet passage, the two parts capable of being assembled in either one of two relative angular positions, whereby each scoop pump outlet passage can be located at either end region of the associated scoop, depending on the intended sense of rotation of the rotary casing relative to the inner clutch member.

7. A viscous fluid shear clutch according to claim 6, wherein said two parts are connected together by means of a series of respective male and female connecting elements equiangularly spaced about an axis at a pitch whereby each scoop pump outlet passage can be located at either end region of the associated scoop by indexing one part relative to the other about said axis by the angular pitch of the connecting elements.

8. A viscous fluid shear clutch according to claim 1, wherein said thermal sensor means includes:
   a thermo pressure valve having a valve body defining an inlet for servo fluid, an outlet for connection to said actuator, and a vent,
   shuttle spool means linearly movable within said body between a first position, which allows communication between said inlet and said outlet, and a second position which allows communication between said outlet and said vent, and
   a sensor element responsive to the sensed temperature for moving said shuttle spool means.

9. A viscous fluid shear clutch according to claim 8, wherein said shuttle spool means isolates both said inlet and said vent from said outlet when it is in an intermediate position.

10. A viscous fluid shear clutch according to claim 9, wherein said shuttle spool means is provided with spaced seal surface means engageable in resilient sealing manner with respective valve seats in said valve body.

11. A viscous fluid shear clutch according to claim 10, wherein said shuttle spool means is adjustable to allow spacing of said spaced regions between said seal surface means to be set as required.

12. A viscous fluid shear clutch according to claim 10, wherein each seal surface means comprises a resilient 'O' ring.

13. A viscous fluid shear clutch according to claim 12, wherein movement of said shuttle spool means away from said intermediate position causes resilient compression of one of said 'O' rings against its valve seat and lifting of the other 'O' ring from its valve seat.

14. A viscous fluid shear clutch according to claim 8, wherein bias means is provided for applying an adjustable bias force to said shuttle spool means.

15. A viscous fluid clutch according to claim 8, wherein said thermal sensor means comprises:
   a valve body defining an inlet for servo fluid, an outlet for connection to said actuator, and a vent,
   a shuttle spool means linearly movable in said body and having two seal regions at a preset spacing for cooperating with a corresponding two complementary seal regions at another preset spacing in the valve body, one seal region and its complementary seal region being cooperable to control flow between said inlet and said outlet and the other seal region and its complementary seal region being cooperable to control flow between said outlet and said vent, each said seal region and its complementary seal region having resilient seal means associated therewith, the spacing of said seal regions being selected such that movement of the shuttle spool from an equilibrium position causes one resilient seal means to be loaded while the seal region and complementary seal region associated with the other seal means separate to allow flow.

16. A viscous fluid shear clutch for providing drive between an engine and a cooling fan, said clutch comprising:
- a rotary casing,
- an inner clutch member within the casing and spaced therefrom by a clearance gap,
- a fluid reservoir communicating with said clearance gap,
- pump means arranged to pump fluid from the clearance gap to the reservoir in response to relative rotation between the casing and the inner clutch member,
- valve means arranged to control the flow of fluid between the pump means and the clearance gap and including a movable control element,
- thermal sensor means including a remote sensor for sensing a temperature of a coolant fluid for the engine and a separate actuator for applying to said movable control element a modulated temperature dependent force which decreases with sensed temperature whereby the force applied in response to a given temperature is substantially invariant,
- bias means for generating a bias force tending to oppose said temperature dependent force, whereby an increase in the sensed temperature tends to adjust the valve means to increase the fluid in the clearance gap.

* * * * *

UNITED STATES PATENT AND TRADEMARK OFFICE
CERTIFICATE OF CORRECTION

PATENT NO. : 5,042,629

DATED : August 27, 1991

INVENTOR(S) : Arthur E. H. Elmer

It is certified that error appears in the above-identified patent and that said Letters Patent is hereby corrected as shown below:

Column 6, line 59:

"800 rmp" should be --800 rpm--

Column 7, line 59:

"trails in an" should be --trails in the--

Signed and Sealed this

Eighteenth Day of May, 1993

Attest:

MICHAEL K. KIRK

Attesting Officer

Acting Commissioner of Patents and Trademarks